United States Patent Office 3,565,886
Patented Feb. 23, 1971

3,565,886
PHOSPHORYLATION OF CELLULOSIC MATERIAL HAVING FREE HYDROXYL GROUPS
Louis-Philippe Clermont, Ottawa, Ontario, Canada, assignor to Canadian Patents and Development Limited, Ottawa, Ontario, Canada, a corporation of Canada
No Drawing. Filed Sept. 12, 1969, Ser. No. 857,533
Int. Cl. C08b 3/22, 5/04, 11/20
U.S. Cl. 260—219
9 Claims

ABSTRACT OF THE DISCLOSURE

A method for phosphorylating cellulosic material such as cellulose and cellulose derivatives particularly the esters and ethers by reacting the cellulosic material with a solution of phosphorus pentoxide in dimethylformamide. Phosphorylated cellulose derivatives containing about 4 to about 10% by wt. bound phosphorus have been prepared.

---

This invention deals with a simple and rapid process of introducing phosphorus into cellulosic material which contains some free hydroxyl groups particularly cellulose derivatives. Phosphorus pentoxide is dissolved in dimethylformamide (with heating) and the solution is used as phosphorylating agent. The amount of phosphorus which can be introduced depends on the number of free hydroxyl groups available. On phosphorylation the solubility of the cellulosic material in most solvents is decreased and flame-resistance increased with increasing phosphorus content.

Many processes exist for the preparation of cellulose phosphates but very few for the phosphorylation of cellulose derivatives. U.S. Pat. 1,962,827, June 12, 1934, describes the preparation of cellulose derivatives containing phosphorus by reaction with phosphorus pentoxide suspended in a solvent for the cellulose derivative. The solvents described are tetrachloroethane, ethylene chloride, chloroform and tricresyl phosphate. These solvents do not react with the phosphorus pentoxide but dissolve the cellulose derivatives treated. Reaction times are long (10–24 hours) and the resulting phosphorus content is low (1–2%). Apparently the products have no ion-exchange properties.

According to the present invention, a more active phosphorylating agent for free hydroxyl-containing cellulosic material is prepared by dissolving phosphorus pentoxide in dimethylformamide (DMF) to form a complex. While phosphorus pentoxide is insoluble in DMF at room temperature, with heating the $P_2O_5$ goes into solution forming a stable complex that does not precipitate at room temperature. The complex may be prepared by adding the phosphorus pentoxide (preferably about 2 to 5 gm. per 100 ml. of DMF) to the DMF and heating with stirring at, e.g., 45–70° C. until the $P_2O_5$ has dissolved (usually about one hour). The solution gradually becomes amber coloured. It has been found that this phosphorylating agent is more active when stored for 2–3 days prior to use. The complex appears to be quite stable and has been kept at room temperature for months without any precipitation occurring. Either distilled or technical grade DMF has been found suitable. Dimethylacetamide has been found to be a poorer solvent for $P_2O_5$ and is less advantageous.

The cellulosic material which may be phosphorylated is preferably the derivatives which have unreacted hydroxyl groups available such as the partly substituted esters and ethers. Completely esterified or etherified derivatives can be used if the ester or ether substituent itself has some available hydroxyl groups. Cellulose itself (paper, cotton, etc.) has been phosphorylated rapidly to about 1–1.5% P at room temperature. Mercerized or aged alkali cellulose should have increased reactivity (available hydroxyls). The cellulosic material need not be soluble in DMF. Cellulose derivatives can readily be phosphorylated by this process to 4–10% wt. or more phosphorus content (these products are believed to be novel).

Phosphorylation with $P_2O_5$-DMF takes place rapidly (usually within 1–15 minutes) at room temperature. It may be desirable in some cases to let the reaction mixture stand for up to one hour or more to improve filterability of the product and increase the P content still further. Heating may be used to improve filterability, e.g., to 75 to 100° C. A suitable temperature range for phosphorylation is from about 20 to about 100° C. (the temperature is not critical). The amount of $P_2O_5$ dissolved in the DMF is not critical and can vary from about 1% wt./vol. to saturation, with 2–5% preferred. The amount of $P_2O_5$-DMF solution or complex used to phosphorylate the cellulosic material is also not critical and depends on the amount of available hydroxyl groups and the desired P content.

The phosphorylated products are generally water-insoluble (and insoluble in most organic solvents) and have improved flame-resistance—the degree of flame-resistance increasing with the phosphorus content. The higher phosphorus content products have useful ion-exchange properties. Because of the high flame-resistance of these products they are useful for instance as fillers in plastics, paper, paints and coatings, as packing or gasket material, and as a textlie fiber component or coating. Their high solvent resistance is desirable in many applications.

The following examples are illustrative. The 5% wt./vol. $P_2O_5$ in DMF was prepared by stirring at 60–70° C. for one hour. An excess of phosphorylating agent was used in each case.

EXAMPLE 1

A one gm. sample of commercial, water-soluble hydroxyethylcellulose was swollen or partly dissolved in DMF (25 ml.) at room temperature. After 15 minutes, 50 ml. of 5% $P_2O_5$ in DMF was added. After 30 minutes at room temperature, a precipitate formed which was allowed to stand for one hour to improve its filterability. The precipitate was filtered, washed with water until the pH of the wash water was about 4, then washed with 1% sodium hydroxide solution and finally washed with water. A dilute acid wash may be used to remove the last traces of alkali. The precipitate was finally oven-dried or dried by solvent exchange with methanol or acetone. The water-insoluble product (1.28 gm.) had a P content of 10.0%.

EXAMPLE 2

A one gm. sample of the same hydroxyethylcellulose as in Example 1 was swollen and partly dissolved in 25 ml. DMF, 50 ml. of 5% $P_2O_5$ in DMF added and the solution heated at 75° C. Within 5 min., a gel formed which was easily broken up, filtered and washed as in Example 1. The phosphorus content of the product was 8.7%.

EXAMPLE 3

A one gm. sample of a similar hydroxyethylcellulose was dispersed in DMF and allowed to stand for about two hours at room temperature to swell and partly dissolve the sample. The 50 ml. of 5% $P_2O_5$ in DMF was added, and within one min. a gel formed which broke up into small swollen particles after 5 min. The product was recovered by centrifuging, washed with water, 1%

NaOH solution, and water as in Example 1. The phosphorus content was 8.1%.

EXAMPLE 4

To a one gm. sample of hydroxyethylcellulose, 50 ml. of 5% $P_2O_5$ in DMF was added and the suspension stirred at room temperature. After 15 min. the product was filtered and washed as in Example 1. The P content was 7.1%.

EXAMPLE 5

A one gm. sample of methyl cellulose [viscosity 1500 cps., D.S. (degree of substitution) 1.6–2.0] was swollen and partly dissolved in 25 ml. of DMF. Then 25 ml. of 5% $P_2O_5$ in DMF was added and the solution stirred at room temperature. After 15 min. a precipitate formed, which was let stand for one hour. The product filtered readily, was insoluble in water and most organic solvents and was very flame resistant (about 6.7% P).

EXAMPLE 6

To a one gm. sample of a similar methyl cellulose, 50 ml. of 5% $P_2O_5$ in DMF was added and the suspension shaken at room temperature. After 15 min. the suspension was centrifuged, the product washed as in Example 1 and oven dried at 65° C. The product weighed 1.12 gm. and contained 5.6% P.

EXAMPLE 7

A one gm. sample of carboxymethyl cellulose (a commerical cellulose gum) was swollen in 25 ml. of DMF. After 15 min., 25 ml. of 5% $P_2O_5$ in DMF was added and the suspension shaken at room temperature for one hour. The suspension was then centrifuged, washed with water, 1% NaOH solution, water and air-dried. The product was water-insoluble, resisted burning and contained 5.1% P.

EXAMPLE 8

A one gm. sample of cellulose nitrate (10.0% N) was treated at room temperature with 50 ml. of 5% $P_2O_5$ in DMF for one hour. The product was filtered and washed as in Example 1. Its flammability was greatly reduced (P content 4.7%).

EXAMPLE 9

To a one gm. sample of partially acetylated cellulose (Whatman (trademark) filter paper No. 1) of acetyl content 25%, 50 ml. of 5% $P_2O_5$ in DMF was added and the suspension shaken occasionally at room temperature for one hour. The product was filtered and washed as in Example 1 (P content 1.1%). A treatment time of 16 hours at room temperature increased the P content to 1.8%. Both products showed increased flame-resistance.

EXAMPLE 10

A one gm. sample of cotton batting (D.P. 1700) was treated at room temperature with 50 ml. of 5% $P_2O_5$ in DMF for one hour. The product contained 0.8% P. After a reaction time of 16 hours the P content was 1.1%. A similar treatment of filter paper (Whatman No. 1) gave a product with 1.65% P after 16 hours at room temperature.

EXAMPLE 11

Thermogravimetric analysis showed that a sample of hydroxyethyl cellulose containing 8.7% P had a weight loss of 42% at 500° C., compared to 95% wt. loss for an untreated sample. A phosphorylated methyl cellulose sample (6.7% P) had a wt. loss of 50% at 500° C., compared to 98% for the untreated sample. At 300° C. a sample of phosphorylated carboxymethyl cellulose lost 30% of its wt. compared to 60% for an untreated sample.

The phosphorylated cellulose derivatives having phosphorus contents above about 4% showed ion-exchange properties and liberated acid from a sodium chloride solution. The exchange capacity increased in direct proportion to the P content, e.g., a methyl cellulose product containing 5.6% P had an exchange capacity of 1.15 milliequivalent per gm., and hydroxyethylcelluloses containing 8.1 and 10.0% P had exchange capacities of 1.81 and 2.16 meq./gm. respectively.

In all the above examples, the remaining filtrate or centrifugate treating solution may be reused for the phosphorylation of more cellulosic material until exhaustion of the $P_2O_5$-DMF complex. The DMF can be recovered, e.g., by distillation, and recycled. The process can be carried out continuously by appropriate adaptation.

What is claimed is:

1. A process for phosphorylating cellulosic material having free hydroxyl groups comprising dissolving at least about 1% weight/volume phosphorus pentoxide in dimethylformamide and reacting the cellulosic material with this solution whereby phosphorus is incorporated into said material.

2. The process of claim 1 wherein the cellulosic material is a cellulose ester or ether.

3. The process of claim 1 wherein the temperature of reaction with the cellulosic material is about 20 to 100° C.

4. The process of claim 1 wherein the reaction time is from 1 to 15 minutes.

5. The process of claim 1 wherein the amount of $P_2O_5$ dissolved is from about 2 to about 5% weight/volume of dimethylformamide.

6. The process of claim 1 wherein the cellulosic material dissolves in the solution.

7. The process of claim 1 wherein from about 4 to about 10% weight of phosphorus is introduced into a cellulose derivative.

8. A water-insoluble phosphorylated cellulose derivative selected from the group consisting of esters and ethers, containing from about 4 to about 10% by weight bound phosphorus.

9. The phosphorylated cellulose derivative of claim 8 wherein the derivative is cellulose nitrate.

References Cited

UNITED STATES PATENTS

| | | | |
|---|---|---|---|
| 1,962,827 | 6/1934 | Malm et al. | 260—219 |
| 2,759,924 | 8/1956 | Touey | 260—219 |

DONALD E. CZAJA, Primary Examiner

R. W. GRIFFIN, Assistant Examiner

U.S. Cl. X.R.

8—115.6; 117—136; 162—80; 260—232